3,043,714
COATING COMPOSITIONS COMPRISING VINYL CHLORIDE-VINYLIDENE CHLORIDE COPOLYMER AND ALDEHYDE-KETONE CONDENSATION PRODUCT MODIFIER AND ARTICLES THEREWITH

Henry J. Bach, Mount Lebanon Township, Allegheny County, Pa., assignor, by mesne assignments, to Martin-Marietta Corporation, Chicago, Ill., a corporation of Maryland
No Drawing. Filed Feb. 23, 1961, Ser. No. 90,976
15 Claims. (Cl. 117—75)

The present invention relates to improved vinyl chloride-vinylidene chloride copolymer containing coating compositions and particularly to such coating compositions adapted for application from solvent medium containing large amounts of aromatic hydrocarbon solvents. The invention is more particularly directed to improving the adhesion and water resistance of coatings produced by baking coating compositions of the above indicated type. The invention is especially directed to the coating of sanitary cans and more particularly the coating of the interior surfaces of containers for food, beverages, and other products in which it is important that contact between the coating and the product packaged within the container not result in imparting undesirable flavor or odor to the product.

THE FIELD OF THE INVENTION

The development of improved sanitary coatings for food and beverage containers, and their closures, requires consideration of many special requirements which must be observed in regard to such coatings as well as overall consideration of economy.

A first requirement is good solubility in liquid aromatic hydrocarbon solvents, which are relatively inexpensive and available. Copolymers of vinyl chloride and vinyl acetate containing large amounts of vinyl chloride are well known for the coating of sanitary cans, but these copolymers require excessively large proportions of relatively expensive solvents such as ketones and similar active solvents for vinyl chloride resin. Since the solvent constitutes the major portion of the coating compositions and since only a limited proportion of the resin is soluble without exceeding desirable coating viscosities, the cost factor which is involved will be appreciated.

In the United States patent to Daniel M. Gray and George L. Reymann, No. 2,675,334, issued April 13, 1954, there are disclosed various copolymers of vinyl chloride and vinylidene chloride which are soluble in large amount in solvent medium comprising a high proportion of liquid aromatic hydrocarbon solvent. The coating compositions set forth in Patent 2,675,334 are insufficiently adherent and lack adequate resistance to water at elevated temperature for some sanitary coating purposes.

The present invention is directed to modification of coating compositions of the type disclosed in Patent No. 2,675,334 to improve the adhesion of these coating compositions to surfaces and particularly to tinplate, especially primed tinplate and preferably also to improve resistance to water at elevated temperature. The invention is particularly directed to modified coatings as above indicated in which the high solubility in liquid aromatic hydrocarbon solvent medium possessed by the unmodified vinyl chloride-vinylidene chloride copolymer is retained and without the introduction of undesirable flavor and odor imparting components.

THE INVENTION

In accordance with the present invention, it has been discovered that aromatic soluble vinyl chloride-vinylidene chloride copolymer resins may be improved by adding a minor amount of a resin prepared by condensing a methyl lower alkyl ketone with an excess of formaldehyde in aqueous alkaline medium until the resinous product has a softening point (ring and ball method) in excess of about 100° C. It has further been found that mixtures of resins specified above are mutually compatible in solvent medium containing a large amount of liquid aromatic hydrocarbon solvent and even in substantially pure liquid aromatic hydrocarbon solvent and that this compatibility is maintained upon deposition and baking of these solutions so that clear and uniform coatings may be achieved. It has still further been found that the coatings are essentially flavorless and odorless and adaptable for this reason to substantially all sanitary can coating situations.

THE VINYL CHLORIDE-VINYLIDENE CHLORIDE COPOLYMER COMPONENT

As previously indicated, the vinyl chloride-vinylidene chloride copolymers which are modified in accordance with the invention are the liquid aromatic hydrocarbon solvent-soluble copolymers containing from about 30% to about 75% by weight of vinyl chloride, the balance of the copolymer being vinylidene chloride, the copolymer having a specific viscosity within the range of about 0.12 to about 0.30 inclusive, as determined at 20° C. using a 0.4% solution of the copolymer in nitrobenzene. A specific viscosity below the stated range results in relatively brittle coatings with poor thermal stability and above the stated range results in excessively high solution viscosity for the purposes of the invention. The copolymer should be substantially free of homopolymers of vinyl chloride and vinylidene chloride respectively, or copolymers thereof which are outside of the above stated range of proportions. Thus, it is necessary to control the polymerization conditions, or to purify the copolymer by filtration or otherwise to insure that homopolymers and copolymers of improper compositions are substantially excluded.

Example I

An example of a copolymer of vinyl chloride and vinylidene chloride which may be used in accordance with the invention is as follows:

82 parts of vinyl chloride and 18 parts of vinylidene chloride were placed together in a glass container at 20° C. and exposed with agitation to ultra-violet light. The ultra-violet light was provided with a 100 watt General Electric —7 mercury vapor lamp. After 36 to 72 hours of such treatment, the resulting mixture of copolymer and unreacted monomers was removed from the container and dried to remove the unreacted monomers. The copolymer obtained contained vinyl chloride in an amount of 60% by weight, the balance of the copolymer being vinylidene chloride. As will be evident, the vinylidene chloride entered the copolymer at a faster rate than the vinyl chloride. Copolymers with other ratios of vinyl chloride and vinylidene chloride content may be prepared in like manner by varying the proportion of monomers in the starting charge.

Other methods of producing a usable copolymer may be employed such as the above method without ultra-violet light but using a free-radical generating polymerization catalyst such as a peroxide, a persulfate, or an azo compound typified by benzoyl peroxide, and, if necessary to provide complete solubility in aromatic solvents such as xylene, with subsequent filtration to remove the homopolymers and copolymers of improper composition which are not soluble.

Examples of suitable commercially available copolymers of vinyl chloride and vinylidene chloride are Geon 222 of B. F. Goodrich, Cleveland, Ohio, and "VCVC"

of Bakelite Division of Union Carbide and Carbon Corp., New York, N.Y., which have vinyl chloride, vinylidene chloride ratios of substantially 60/40 and are useful for the purposes of the invention, subject to the above identified requirements of xylene solubility and of range of viscosity. The examples of "Geon 222" hereinafter referred to are those satisfying the said requirements.

THE MODIFIER COMPONENT

In accordance with the invention there is incorporated in a solution of the vinyl chloride-vinylidene chloride copolymer resins described hereinbefore in a solvent medium comprising a large proportion of liquid aromatic hydrocarbon solvent, a minor amount of a resin prepared by condensing a methyl lower alkyl ketone with an excess of formaldehyde in aqueous alkaline medium until the resinous product has a softening point (ring and ball method) in excess of about 100° C.

More particularly, the condensation products which are employed in accordance with the invention are thermoplastic aromatic solvent-soluble condensation products of an aldehyde with a ketone having the formula:

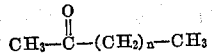

in which $n$ is an integer from 1 to 4. Mixtures of such ketones may also be employed. Minor amounts, up to about 20% by weight, based on the weight of the ketone component, of other ketones may be employed, as partial replacement for the ketone component specified. The preferred aldehyde is formaldehyde though agents generating formaldehyde, such as paraformaldehyde, are also useful. Other mono-aldehydes such as acetaldehyde, propionaldehyde, butyraldehyde and benzaldehyde, are less preferred, but may be used. The term "aldehyde" is intended to refer to a mono-aldehyde or a substance generating the same.

The aldehyde component is employed in molar excess, there being present in the reaction mixture from about 1.3 to about 2.5 and preferably from about 1.6 to about 2.2 mols of formaldehyde per mol of ketone component. The ketone component and the aldehyde component in the mol ratio specified are reacted together in aqueous solution medium in the presence of an alkaline catalyst, preferably constituted by a strongly alkaline material such as sodium hydroxide, potassium hydroxide, calcium hydroxide, potassium carbonate, sodium carbonate, etc. These strongly alkaline materials provide an exothermic reaction between the ketone component and the aldehyde component after the reaction has been initiated with the aid of externally supplied heat. The alkaline catalyst is normally employed in an amount of about 1–4% by weight based on the combined weight of ketone and aldehyde components. Preferably, the proportion of alkaline catalyst is between 2 and 3% on the said weight basis. The reaction may be carried out at temperatures in the range of 160°–210° F., somewhat higher temperatures being permissible when the reaction is carried out under pressure. The reaction is continued until the resinous condensate which is produced possesses a softening point above 100° C. and preferably above 110° C. The condensation reaction may be continued, particularly when the ratio of formaldehyde to ketone is large, e.g., about 2.5 to 1 to provide resins having softening points considerably in excess of 110° C. and condensates having a softening point up to about 175° C. may be employed in accordance with the invention.

The modifier resins employed in accordance with the invention are characterized by high solubility in substantially pure liquid aromatic hydrocarbon solvent, e.g., 25 parts of the resin will be completely dissolved in 75 parts of toluene or xylene.

Example II

An example of a resin prepared by condensing a methyl lower alkyl ketone with an excess of formaldehyde in aqueous alkaline medium until the resinous product has a softening point (ring and ball method) in excess of about 100° C. is as follows:

1 mol of methyl ethyl ketone was dissolved in 2 mols of a 37% aqueous formaldehyde solution and concentrated sodium hydroxide in water solution was slowly added with stirring at the same time that the reaction mixture was heated. The external heat was discontinued as soon as the reaction started, the initiation of reaction being noticed by an increase in the rate of temperature build-up. It was observed that exothermic reaction was initiated at a temperature of about 125° F. in the presence of about 1% by weight of caustic. Addition of caustic was continued until a total of 2% of caustic had been added. The temperature was allowed to increase until it reached 180° F. at which time the reaction vessel was cooled to maintain the temperature at 180° F. The reaction mixture was constantly stirred. The reaction was permitted to continue at 180° F. until the temperature dropped which occurred after a reaction period of 1½ hours. Thereafter, additional caustic was added to a total of 3% by weight and the reaction mixture was heated with constant stirring to cause the temperature to slowly increase to 200° F. which temperature was maintained for 2½ hours. The reaction mixture was then cooled to a temperature of 140–150° F. and neutralized to a pH of about 7.0 by the addition of sulfuric acid. A vacuum created by a water pump was then applied to remove unreacted ketone and formaldehyde and to concentrate the reaction product by removal of water. A resinous product precipitated from the water solution and was removed by decantation and then filtered hot. The product was a solid at room temperature having a softening point of about 115° C.

A commercially available condensation product approximately comparable to that set forth in Example II in RBH 588 (RBH Dispersions, Division of Interchemical Corp.).

Example III

Example II was repeated using methyl propyl ketone, methyl butyl ketone, methyl isobutyl ketone, methyl amyl ketone and equal weight ratios of the foregoing with methyl ethyl ketone. Approximately comparable resins were obtained, all of which were usable in accordance with the invention.

PROPORTION OF MODIFIER RESIN IN COATING COMPOSITION

In accordance with the invention, there must be present in the aromatic hydrocarbon solvent solution of copolymers of vinyl chloride and vinylidene chloride at least about 3% by weight of condensation product of an aldehyde and a methyl alkyl ketone as has been defined herein, said percentage being based on the mixture of vinyl chloride-vinylidene chloride copolymer and modifier resin. When 3% or more of the resinous condensation product is present, the dry adhesion of baked coatings to a base and particularly commercially primed tinplate is significantly improved.

Preferably, at least about 5% by weight of modifier resin, based on the mixture of vinyl chloride-vinylidene chloride copolymer and modifier resin, is employed in order to achieve a significant improvement in resistance to water at elevated temperatures. Specifically, and as evidenced by subjecting tinplate, especially primed tinplate coated in accordance with the invention to water in both liquid and vapor forms at a temperature of 170° F., for 45 minutes, the adhesion of the coating to tinplate, particularly the primed tinplate base remains good.

It is preferred, in accordance with the invention, to produce a solution in which the copolymers are compatible with one another so that clear coatings may be produced. To insure compatibility, it is preferred that the proportion of modifier copolymer in the mixture of copolymers be less than about 20% by weight.

SOLVENT SOLUTION APPLICATION

In accordance with the invention, coating is effected from a solvent solution in which the solvent is largely or preferably entirely constituted by liquid aromatic hydrocarbon solvent. Preferred aromatic solvents are mononuclear, such as benzene, toluene, xylene, ethylbenzene, and isomers and homologs thereof, these being useful either alone or in admixture with one another. Condensed aromatic solvents such as methyl naphthalene may also be employed either alone or in admixture with mononuclear aromatic hydrocarbons. Toluene and xylene are particularly preferred.

It is preferred, in accordance with the invention, to provide solvent solutions containing at least about 20% and preferably at least about 25% by weight of resin solids, based on the weight of the solution.

While it is preferred to employ a solvent medium consisting of liquid aromatic hydrocarbon solvent, the invention does not exclude the presence of small proportions, preferably not exceeding 15% by weight, based on the total weight of solvent, of more active solvents for vinyl resins. It will be observed, however, that since the present invention permits the attainment of 25% resin solids in solvent solution mediums of suitable coating viscosity and consisting of aromatic hydrocarbon solvent, that the addition of more active solvents for vinyl resins such as ketones and ester solvents is not necessary.

Thus, minor amounts of ketone and ester solvents such as methyl ethyl ketone, methyl isobutyl ketone, cyclohexanone, isophorone, ethyl acetate and butyl propionate may be employed in special cases where it is desired to obtain even higher resin solids at a given viscosity than can be obtained with aromatic hydrocarbons alone, and where solvent cost is a minor consideration. It is emphasized, however, that the employment of ketones and esters is not a necessary requirement for effectuating substantially complete solution of the resinous mixtures of the invention and that entirely acceptable coating solutions are obtained by the employment of aromatic hydrocarbon solvents alone.

The utilization of lower alcohols such as ethanol, isopropanol and butanol in an amount of up to about 1 or 2% for the purpose of clarifying the solvent solutions which are prepared is disclosed in the said Patent 2,675,334 and such small amounts of lower alcohols may be present for the same purpose in accordance with the present invention.

The solution coating compositions of the invention may be applied in any conventional manner as, for example, by dipping, roller coating, spraying, etc.

Example IV 23.8 parts of the copolymer of vinyl chloride and vinylidene chloride produced in Example I and 1.2 parts of the methyl ethyl ketone-formaldehyde condensate produced in Example II were dissolved in 75 parts of toluene. The resulting solution containing 25% by weight of resin solids was clear and had a No. 4 Ford cup viscosity at 80° F. of about 35 seconds. This solution was coated on tinplate and also on commercially primed tinplate beverage container stock at 5–6 mg./sq. in. and baked 6–7 minutes at 300° F. The resulting baked coating was found to have good pasteurization blush resistance, excellent dry adhesion and the baked films were found to be essentially flavorless.

Example V

Example IV was repeated employing Geon 222 as the copolymer of vinyl chloride and vinylidene chloride in place of the copolymer of Example I. The Geon 222 employed contained 40% by weight of vinylidene chloride and 60% by weight of vinyl chloride. The copolymer was characterized by a specific viscosity of 0.15 determined at 20° C. in a 0.4% solution of pure nitrobenzene. The same results reported in Example IV were achieved in the present example.

Example VI

Examples IV and V were repeated using RBH 588 in place of the methyl ethyl ketone-formaldehyde condensation product of Example II. The same results were again obtained. Similarly, using the condensation product of Example III in place of the condensation product of Example II, substantially the same results were obtained.

Example VII

Examples IV, V and VI were repeated utilizing 22.5 parts of copolymer of vinyl chloride and vinylidene chloride and 2.5 parts of methyl ethyl ketone-formaldehyde condensation product. Substantially the same results were achieved with the exception that the adhesion of the coating to the commercially primed tinplate following treatment of the coated base with water at a temperature of 170° F. for a period of about 45 minutes was greatly improved. The No. 4 Ford cup viscosity at 80° F. of the solution containing 2.5 parts of methyl ethyl ketone-formaldehyde condensation product was about 40 seconds.

The results which are achieved by the application of coatings having a film weight of 5–6 mgs./sq. in. from 25% resin solids solution in toluene over commercially primed tinplate followed by baking for from 6–7 minutes at 300° F. as the proportion of resinous condensation product is increased is illustrated in Table I which follows:

TABLE I

| Resin Composition | | Dry Adhesion (Scotch Tape) | Pasteurization Resistance | | |
|---|---|---|---|---|---|
| Copolymer, Example I | Condensation Product, Ex. II | | Blush | Wet Adhesion | Flavor |
| 100 | 0 | 0–2 | 7–9 (8) | 0 (0) | None |
| 98 | 2 | 5 | 8 (8) | 5 (2) | None |
| 95 | 5 | 10 | 10 (9) | 10 (7) | None |
| 90 | 10 | 10 | 10 (9) | 10 (8) | None |
| 85 | 15 | 10 | 10 (9) | 10 (9) | None |

The blush and wet adhesion ratings in parenthesis are for coatings tested in liquid phase; the other readings are for vapor phase exposure.

All of the solutions tested in Table I were clear and no evidence of incompatibility either in the solution or in the resulting baked film was noted.

The commercial priming compositions which are referred to in the examples and in the table presented hereinbefore are commercial oleoresinous, epoxy and phenolic primers well known in the art to be suitable primers for the topcoats of the invention.

Example VIII

An example of a preferred oleoresinous phenol-aldehyde varnish primer usable to produce a prime coat in accordance with the invention and which primer is the commercial primer referred to in Examples IV–VII is made as follows:

20 parts of oil-soluble ortho cresol/formaldehyde resin and 20 parts of tung oil are mixed in an open varnish kettle and heated to 325° F. in about 15 minutes. The temperature is then raised to 380° F. and held for approximately 1.5 hours. The oleoresinous primer so produced is thinned with 60 parts of xylene and may be coated upon blackplate or tinplate and cured by baking for 10 minutes at 400° F.

The oil-soluble ortho cresol/formaldehyde resin referred to above was produced by condensing 1 mol of ortho cresol with 1 mol of formaldehyde in water solution containing 1% by weight, based on the weight of the cresol, of ammonium hydroxide. The solution was maintained at reflux temperature until the exothermic reaction ceased and refluxing was continued for three-quarters of an hour to insure completion of the reaction. Water was then removed by vacuum distillation to provide a hard and friable resin having a melting point of 160–180° F.

Oleoresinous primers are not generally usable to serve as a base for a topcoat comprising a copolymer of vinyl chlorine and vinylidene chloride because of poor adhesion of the topcoat to the primer. In accordance with the invention, the inclusion of the lower alkyl ketone-aldehyde condensate in admixture with the vinyl chloride-vinylidene chloride copolymer provides good adhesion of the modified topcoat to oleoresinous primers.

While it is preferred to employ the coating compositions of the invention on tinplate, especially commercially primed tinplate, they are also useful when used on other surfaces.

It will be understood that the invention is not limited to the specific formulas and ingredients recited in the foregoing examples and that pigments, dyes, waxes and other similar ingredients may be added to the otherwise clear compositions to provide decorative and similar effects without departing from the scope of this invention.

The invention is defined in the claims which follow.

I claim:

1. A coating composition comprising a compatible solvent solution of a copolymer of vinyl chloride and vinylidene chloride and a thermoplastic aromatic hydrocarbon solvent-soluble condensation product of aldehyde with ketone having the formula

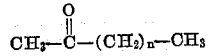

in which $n$ is an integer from 1–4 in a solvent medium comprising a large proportion of liquid aromatic hydrocarbon solvent, said copolymer of vinyl chloride and vinylidene chloride containing from about 30% to about 75% by weight of vinyl chloride with the balance of the copolymer being vinylidene chloride and having a specific viscosity of about 0.12 to about 0.30 measured in a 0.4% solution of the copolymer in nitrobenzene and being substantially free of homopolymers of vinyl chloride and vinylidene chloride and of copolymers thereof outside of the stated range of proportions and thereby being completely soluble in a 25% by weight solution thereof in toluene, said condensation product containing from 1.3–2.5 mols of aldehyde per mol of ketone and having a softening point from 100–175° C., said condensation product being present in admixture with said copolymer of vinyl chloride and vinylidene chloride in an amount of at least about 3% by weight, based on the weight of the mixture of copolymers.

2. A coating composition as recited in claim 1 in which said solvent medium contains at least about 85% by weight of liquid aromatic hydrocarbon solvent.

3. A coating composition as recited in claim 2 in which said solution contains at least about 20% by weight of resin solids dissolved therein.

4. A coating composition as recited in claim 2 in which said solution contains at least about 25% by weight of resin solids dissolved therein.

5. A coating composition as recited in claim 1 in which said solvent medium consists substantially of liquid aromatic hydrocarbon solvent and said solution contains at least about 20% by weight of resin solids dissolved therein.

6. A coating composition as recited in claim 5 in which said liquid aromatic hydrocarbon solvent is mononuclear.

7. A coating composition as recited in claim 5 in which said liquid aromatic hydrocarbon solvent is selected from the group consisting of benzene, toluene, xylene, ethylbenzene and mixtures thereof.

8. A coating composition as recited in claim 5 in which said solvent medium includes up to about 2% by weight of a lower alkanol.

9. A coating composition as recited in claim 1 in which said aldehyde is formaldehyde.

10. A coating composition as recited in claim 9 in which said ketone is methyl ethyl ketone 11. A coating composition as recited in claim 1 in which said condensation product contains from 1.6–2.2 mols of aldehyde per mol of ketone and has a softening point above 110° C.

12. A coating composition as recited in claim 11 in which said condensation product is a condensation product of formaldehyde and methyl ethyl ketone.

13. A coating composition as recited in claim 1 in which said copolymer of vinyl chloride and vinylidene chloride contains about 60% by weight of vinyl chloride and about 40% by weight of vinylidene chloride.

14. A coated product comprising a base having a baked film adhered to a surface thereof, said film comprising a homogeneous mixture of a copolymer of vinyl chloride and vinylidene chloride containing from about 30% to about 75% by weight of vinyl chloride with the balance of the copolymer being vinylidene chloride and having a specific viscosity of about 0.12 to about 0.30 measured in a 0.4% solution of the copolymer in nitrobenzene and being substantially free of homopolymers of vinyl chloride and vinylidene chloride and of copolymers thereof outside of the stated range of proportions, and at least about 3% by weight, based on the total weight of resin in the mixture, of a thermoplastic aromatic hydrocarbon solvent-soluble condensation product of from 1.3–2.5 mols of aldehyde with 1.0 mol of a ketone having the formula

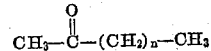

in which $n$ is an integer from 1–4, said condensation product having a softening point of from 100–175° C.

15. A coated product as recited in claim 14 in which said surface is an oleoresinous primer.

References Cited in the file of this patent

UNITED STATES PATENTS

| | | |
|---|---|---|
| Re. 24,702 | Gray et al. | Sept. 22, 1959 |
| 2,410,623 | Ballard et al. | Nov. 5, 1946 |
| 2,675,334 | Gray et al. | Apr. 13, 1954 |
| 2,780,564 | Gray et al. | Feb. 5, 1957 |
| 2,859,192 | Harvey et al. | Nov. 4, 1958 |
| 3,010,846 | Bach | Nov. 28, 1961 |